Oct. 5, 1965 D. W. MOERICKE 3,209,871
DRIVE ARRANGEMENT FOR TRACK WORKING MACHINES AND THE LIKE
Filed May 31, 1963 2 Sheets-Sheet 2
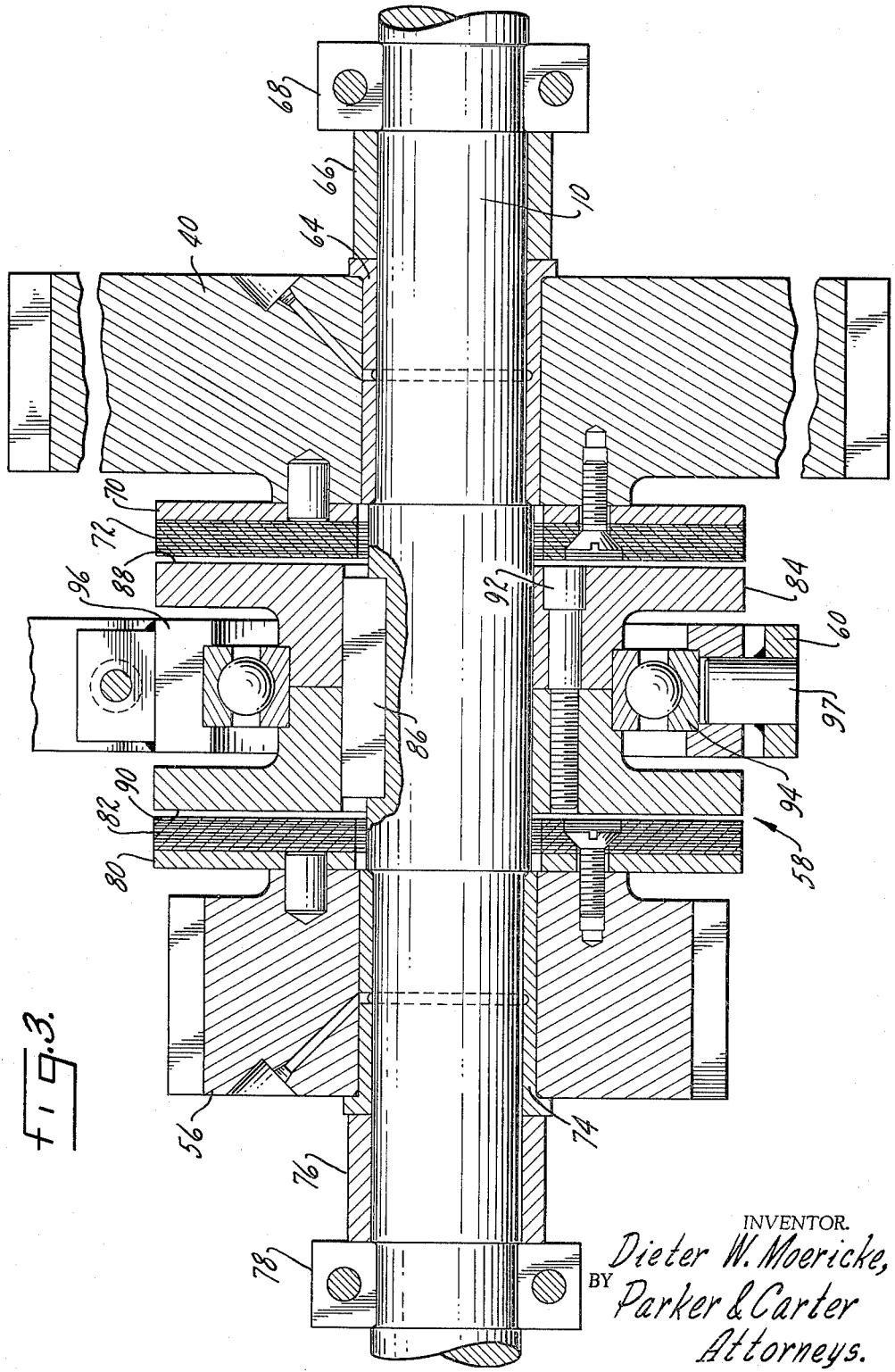
INVENTOR.
Dieter W. Moericke,
BY Parker & Carter
Attorneys.

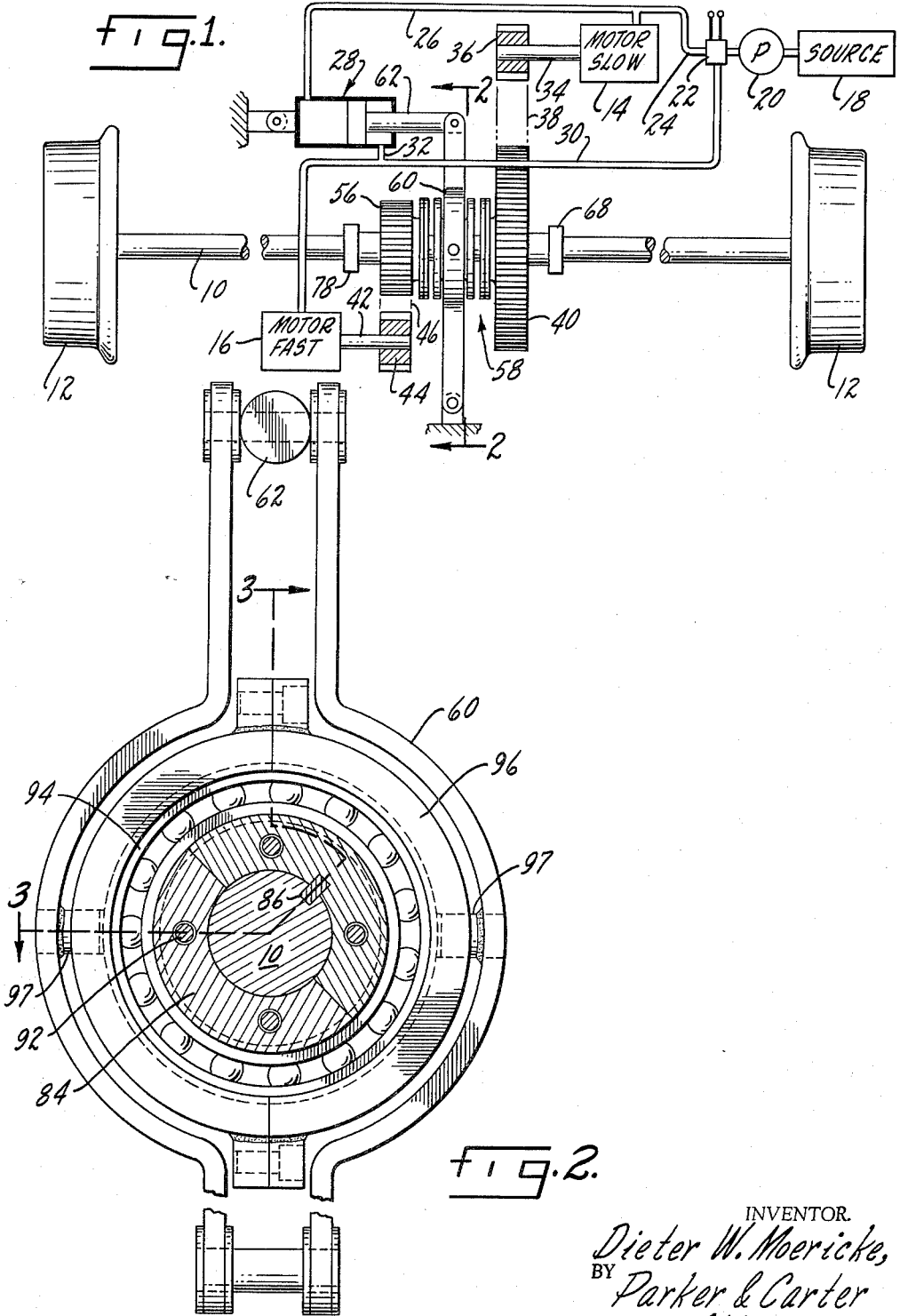

3,209,871
DRIVE ARRANGEMENT FOR TRACK WORKING MACHINES AND THE LIKE
Dieter W. Moericke, Cudahy, Wis., assignor to Nordberg Manufacturing Company, Milwaukee, Wis., a corporation of Wisconsin
Filed May 31, 1963, Ser. No. 284,479
4 Claims. (Cl. 192—.096)

This invention relates to a fluid drive system for track working machines and the like, and has for a primary purpose a two speed fluid drive arrangement.

Another purpose is a fluid drive arrangement in which one or the other of two fluid drive motors may be connected to drive a vehicle.

Another purpose is a vehicle fluid drive arrangement, using a pair of fluid drive motors, and including fluid means for connecting either one or the other of said drive motors to the vehicle drive.

Another purpose is a vehicle drive arrangement of the type described including a fluid clutch for connecting either one or the other of two fluid drive motors to the drive axle of the vehicle.

Another purpose is a fluid drive arrangement of the type described which may be used on any type of vehicle requiring two operating speeds.

Other purposes will appear in the ensuing drawings, specification and claims.

The invention is illustrated diagrammatically in the following drawings wherein:

FIGURE 1 is a schematic illustration of a drive arrangement of the type described.

FIGURE 2 is an enlarged section, along plane 2—2 of FIGURE 1, of the clutch, and FIGURE 3 is a section along plane 3—3 of FIGURE 2.

The invention will be described in connection with a drive arrangement for track working equipment of the type that moves at a relatively slow speed along a railroad track while work is being done by the machine and which moves at a relatively faster rate of speed when moving from one job to another. The invention should not be limited to track working equipment as there are many other types of vehicles which can utilize a two speed type arrangement of the type described.

An axle 10 may have conventional flanged railroad wheels 12 mounted at its outer ends. The axle 10 may be the drive axle of the vehicle in question. The various components that will be described will normally be mounted on the vehicle frame, although in FIGURE 1 they are schematically shown. A pair of fluid drive motors which are preferably hydraulic are indicated at 14 and 16. These motors may be conventional and will receive fluid from a source 18 through a pump 20. The pump may be driven by a gasoline engine or the like. A control 22 is used to direct fluid to either one of the two motors. A line 24 runs from the control 22 to motor 14 and connects with a second line 26 which runs to one side of a piston and cylinder assembly indicated generally at 28. A line 30 runs from control 22 to motor 16 and connects with a line 32 running to the other side of piston and cylinder assembly 28.

Drive motor 14, which may be termed a slow speed motor, has an output shaft 34 mounting a suitable sprocket or the like 36. A chain, belt or other suitable flexible drive member 38 connects sprocket 36 with a suitable large gear or sprocket 40 rotatably mounted on the shaft 10. Motor 16, which may be termed a fast speed motor, has an output shaft 42 mounting a sprocket or the like 44, with sprocket 44 being connected by a chain, belt or other suitable flexible drive member 46 to a gear 56.

Positioned between gears 40 and 56 and mounted for sliding movement on axle 10 is a clutch indicated generally at 58 and connected by a yoke 60 to the piston 62 of piston and cylinder assembly 28.

Turning now to FIGURES 2 and 3, gear 40 is supported on a suitable bearing 64 on axle 10 and a spacer or the like 66 and a fitted ring 68 hold the bearing and gear 40 in position on the axle. Gear 40 mounts an annular disc 70 having a friction facing 72 made of a suitable material for providing frictional driving contact with the clutch body. In like manner, gear 56 may be rotatably mounted on the axle 10 by bearing 74, with the bearing and gear being held in position by a spacer 76 and a fitted ring 78. Gear 56 mounts an annular disc 80 having a friction face 82 positioned for contact with the clutch body.

The clutch 58 may include a clutch body 84 suitably attached, by means of a key or the like 86, to the axle 10 and having clutch faces 88 and 90 positioned opposite the faces 72 and 82 and arranged for frictional contact therewith. The clutch 84 may be formed by a pair of symmetrical members held together by suitable bolts or the like 92. The exact makeup of the clutch body is not essential to the invention.

A bearing 94 encircles the clutch body 84 and a clamp ring or the like 96 holds the bearing in position. The yoke 60 illustrated in FIGURE 1 encircles ring 96 and is pivoted thereto by pins 97. At one end, the yoke 60 will be pivoted to the frame of the vehicle and the other end will be pivoted to the pivot of the piston 62. This is clearly illustrated in FIGURE 1. Movement of the piston 62 will move the clutch body through the yoke and clamp ring.

The use, operation and function of the invention are as follows:

In many types of track working equipment it is desirable to operate the machine at a working speed in which it may move along the track at a rate of anywhere from two to five feet per minute and a running speed in which the machine may move along the track up to speeds of 15 m.p.h. There is no necessity for in between speeds as the machine is either working or it is moving along the track to a new job. One of the two motors shown in FIGURE 1, in this case the motor 14, is a slow speed motor and motor 16 is a high speed motor. When gear 56 is connected by clutch 58 to the axle 10 the vehicle moves along the track at the fast speed specified. Motor 14 on the other hand moves the vehicle along the track at a substantially slower rate of speed both because the motor itself may be a slower speed motor and because it drives the shaft through a larger gear than the fast speed motor.

Control 22 is effective to operate either one or the other of the two motors and also to operate either of these motors in either the forward or reverse direction. Of particular importance is the fact that when one or the other of the two motors is connected for operation, the piston and cylinder assembly 28 simultaneously moves the clutch 58 into contact with the appropriate gear for driving axle 10. For example, when fluid is supplied from the pump 20 to motor 14, fluid is simultaneously supplied behind piston 62 to move the clutch body into contact with gear 40 to connect the gear to the axle 10. On the other hand, when motor 16 is operated, fluid is supplied in front of piston 62 to drive it to the left, as shown in FIGURE 1, to connect the clutch body 84 with gear 56.

Of importance in the fluid control system is the fact that any reverse pressure in the lines back to the pump caused by a heavy load at the axle 10 will have the effect of forcing the clutch and the particular gear in contact therewith into even tighter engagement. For example, assume the particular track working equipment is a so-called track cleaner having an impeller which sweeps ballast in a forward direction along the track. If the cleaner meets an unusually heavy concentration of ballast or is directed rather deep into the ballast, the forward motion of the vehicle will be slowed and there will be pressure built up back through the drive arrangement to the drive motor 14. This back-up pressure is applied through line 26 to the piston and cylinder assembly 28 to force the clutch into even tighter engagement with gear 40. Greater pressure between the clutch friction surfaces, thus providing even firmer contact, will be necessary if there is reverse pressure from a particularly heavy load.

Although the invention has been described generally in connection with track working equipment, it should be realized that a two-speed drive arrangement of the type described has many other applications. Earth moving equipment as well as road vehicles for painting stripes down a highway could also use this type of drive.

As shown, a chain drive or some other type of flexible drive connects the motors to the axle. A direct gear drive may also be satisfactory.

The invention should not be limited to the particular clutch assembly shown as what is important is to be able to connect either one of the two gears to the axle or shaft 10 simultaneously upon actuation of its corresponding fluid drive motor.

Although the invention has been described generally as using hydraulic motors, in some applications air may be satisfactory.

In some applications the clutch may not be directly on the axle, but rather, it will be mounted on a separate shaft suitably connected to the axle.

Whereas the preferred form of the invention has been shown and described herein, it should be realized that there are many modifications, substitutions and alterations thereto, within the scope of the following claims.

I claim:

1. In a two speed fluid drive arrangement, a rotatable shaft, a first fluid drive motor, a first drive member freely rotatable on said shaft, and a driving connection between said first drive member and said first drive motor, a second fluid drive motor, a second drive member freely rotatable on said shaft, and a driving connection between said second drive member and said second drive motor, said drive members being spaced apart on said shaft and a clutch member positioned therebetween, said clutch member being rotationally fixed on said shaft, but slideable thereon, for connecting either one or the other of said drive members to said shaft, said first drive motor, said first drive member, and the driving connection therebetween rotating said shaft in the same direction and at a faster rate of speed than the second drive motor, second drive member and the driving connection therebetween, fluid means for sliding said clutch member into engagement with either one or the other of said drive members, and means for controlling operation of said fluid motors and the fluid means for sliding said clutch member.

2. The structure of claim 1 further characterized in that the fluid means for sliding said clutch member includes a piston and cylinder assembly, with the piston being connected to said clutch member.

3. The structure of claim 1 further characterized in that the fluid means for sliding said clutch member includes a piston and cylinder assembly, said piston being connected to said clutch member, means for controlling operation of said fluid motors whereby only one motor operates at a time, said control means being operable to move said piston simultaneously with the selection of a motor.

4. The structure of claim 3 further characterized by and including a fluid line from said control means to said first motor and to one side of said piston and cylinder assembly, a second fluid line from said control means to said second motor and to the other side of said piston and cylinder assembly.

References Cited by the Examiner

UNITED STATES PATENTS

| 2,063,471 | 12/36 | Stedefeld. |
| 2,598,633 | 5/52 | Baldwin _____ 192—145 |
| 2,675,897 | 4/54 | Wilson. |
| 2,920,729 | 1/60 | Breuer. |
| 3,120,193 | 2/64 | Pettigrew et al. _____ 104—2 |

FOREIGN PATENTS

| 493,060 | 5/53 | Canada. |

DAVID J. WILLIAMOWSKY, *Primary Examiner.*